United States Patent
Morita et al.

(10) Patent No.: US 8,907,632 B2
(45) Date of Patent: Dec. 9, 2014

(54) CHARGE CONTROL DEVICE AND METHOD FOR SECONDARY BATTERY MODULE

(75) Inventors: Tsuyoshi Morita, Zama (JP); Kouhei Kasedou, Zama (JP); Noriko Hoshino, Isehara (JP); Ayuka Kawata, Ebina (JP); Atsushi Kawase, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 468 days.

(21) Appl. No.: 13/264,302

(22) PCT Filed: Jun. 3, 2010

(86) PCT No.: PCT/JP2010/059797
§ 371 (c)(1),
(2), (4) Date: Oct. 13, 2011

(87) PCT Pub. No.: WO2010/143670
PCT Pub. Date: Dec. 16, 2010

(65) Prior Publication Data
US 2012/0038325 A1    Feb. 16, 2012

(30) Foreign Application Priority Data

Jun. 12, 2009 (JP) ................................. 2009-140978
May 31, 2010 (JP) ................................. 2010-124987

(51) Int. Cl.
*H02J 7/04* (2006.01)
*H02J 7/00* (2006.01)
(Continued)

(52) U.S. Cl.
CPC ............. *H01M 10/441* (2013.01); *H02J 7/042* (2013.01); *B60L 11/185* (2013.01);
(Continued)

(58) Field of Classification Search
CPC ......... H02J 7/041; H02J 7/042; H02J 7/0073; H02J 7/0065; H02J 7/0093; H02J 7/0077; H02J 7/022
USPC .......................................... 320/106, 134, 139
See application file for complete search history.

(56) References Cited

U.S. PATENT DOCUMENTS 5,412,307 A    5/1995   Yoshimatsu
5,578,914 A   11/1996   Morita
(Continued)

FOREIGN PATENT DOCUMENTS

CN    1595759 A    3/2005
CN    2760831 Y    2/2006
(Continued)

OTHER PUBLICATIONS

Chinese Office Action, May 16, 2014, 7 pages.
(Continued)

*Primary Examiner* — M'Baye Diao
(74) *Attorney, Agent, or Firm* — Foley & Lardner LLP (57) ABSTRACT

A battery charger 2 equipped with an AC/DC converter charges a secondary battery module 1 constituted with a plurality of unit cells 10. The unit cells 10 are each connected in parallel with a constant voltage circuit 33 constituted with a Zener diode 332 and a resistor 331 connected in series, and the unit cell 10 achieving a state of full charge is detected based upon the difference between the potentials at the two sides of the resistor 331. As a battery controller 32 lowers the charging power used by the battery charger 2 in response to the full charge state being achieved, it is ensured that the secondary battery module 1 is charged thoroughly while preventing individual unit cells 10 from becoming overcharged.

9 Claims, 5 Drawing Sheets (51) Int. Cl.
*H01M 10/44* (2006.01)
*B60L 11/18* (2006.01)
*H01M 10/46* (2006.01)
*H01M 10/48* (2006.01)

(52) U.S. Cl.
CPC ......... *B60L 11/1864* (2013.01); *B60L 2210/30* (2013.01); *H01M 10/46* (2013.01); *H01M 10/482* (2013.01); *H02J 7/0014* (2013.01); *Y02T 10/7005* (2013.01); *Y02T 10/7061* (2013.01); *Y02T 10/7088* (2013.01); *Y02T 10/7241* (2013.01); *Y02T 90/127* (2013.01); *Y02T 90/128* (2013.01); *Y02T 90/14* (2013.01)
USPC ............................ 320/139; 320/106; 320/134

(56) References Cited

U.S. PATENT DOCUMENTS

| | | | |
|---|---|---|---|
| 5,677,613 A | 10/1997 | Perelle | |
| 6,043,631 A | 3/2000 | Tsenter | |
| 6,091,887 A * | 7/2000 | Dieterle et al. | 388/811 |
| 6,452,364 B1 * | 9/2002 | Saeki et al. | 320/137 |
| 6,459,243 B1 | 10/2002 | Cheiky et al. | |
| 7,714,532 B2 * | 5/2010 | Sato | 320/106 |
| 8,237,404 B2 * | 8/2012 | Takano et al. | 320/114 |
| 2004/0012375 A1 | 1/2004 | Bucur | |
| 2005/0017674 A1 * | 1/2005 | Sato | 320/106 |
| 2005/0189916 A1 | 9/2005 | Bucur | |
| 2007/0229034 A1 | 10/2007 | Tatebayashi et al. | |
| 2009/0268371 A1 | 10/2009 | Hishitani et al. | |
| 2010/0219795 A1 * | 9/2010 | Morimoto et al. | 320/145 |
| 2012/0262035 A1 * | 10/2012 | Takano et al. | 310/68 R |

FOREIGN PATENT DOCUMENTS

| | | |
|---|---|---|
| CN | 101013764 A | 8/2007 |
| EP | 0 693 691 A2 | 1/1996 |
| EP | 1 796 243 A2 | 6/2007 |
| JP | 7-336905 A | 12/1995 |
| JP | 9-507378 A | 7/1997 |
| JP | 2001-352692 A | 12/2001 |
| JP | 2004-187398 A | 7/2004 |
| JP | 3988324 B2 | 10/2007 |
| JP | 2008-181763 A | 8/2008 |
| JP | 2008-199828 A | 8/2008 |
| SU | 1557624 A1 | 4/1990 |
| WO | WO 2008/035627 A1 | 3/2008 |

OTHER PUBLICATIONS

Japanese Office Action, Nov. 22, 2013, 4 pages.

* cited by examiner

CHARGE CONTROL DEVICE AND METHOD FOR SECONDARY BATTERY MODULE

FIELD OF THE INVENTION

This invention relates to charge control under which a secondary battery module may be charged.

BACKGROUND OF THE INVENTION

JP 2008-199828A published by the Japanese patent office in the year 2008 discloses a charge control circuit that executes charge control under which a secondary battery module, constituted with a plurality of unit cells layered one on top of another, is charged. The charge control circuit detects voltages at the unit cells, compares the voltage at the secondary battery module with a predetermined voltage value based upon the voltages at the unit cells and controls the current output from a battery charger based upon the comparison results.

SUMMARY OF THE INVENTION

However, the voltage at a unit cell tends to pulsate readily and thus, the voltage detected at the unit cell with certain voltage sampling timing may be unstable, in which case, accurate voltage at the secondary battery module cannot be detected reliably. Unless the level of charge to which the secondary battery module has been charged is ascertained accurately, the charge operation may stop before the secondary battery module is fully charged.

It is therefore an object of this invention to provide a secondary battery module charge control device capable of charging the secondary battery module until it achieves the full charge level while effectively preventing overcharge at individual unit cells.

In order to achieve the above object, this invention provides a charge control device for controlling a charge power by a battery charger that charges the secondary battery module with a direct current provided from an AC/DC converter. The secondary battery module comprises a plurality of unit cells or a plurality of cell groups each constituted with a plurality of unit cells.

The device comprises a constant voltage circuit that is connected to both ends of each unit cell or each cell group and is constituted with a Zener diode and a resistor connected in series, a determination circuit that makes a determination based upon a potential difference between potentials on two sides of the resistor as to whether or not the unit cell or the cell group is in a full charge state, and a programmable controller programmed to control the charge power based upon the full charge state.

This invention also provides a charge control method comprising connecting a constant voltage circuit constituted with a Zener diode and a resistor connected in series to both ends of each unit cell or each cell group, making a determination based upon a potential difference between potentials on two sides of the resistor as to whether or not the unit cell or the cell group is in a full charge state, and controlling the charge power based upon the full charge state.

The details as well as other features and advantages of this invention are set forth in the remainder of the specification and are shown in the accompanying drawings.

DESCRIPTION OF THE PREFERRED EMBODIMENT

Figure 1:
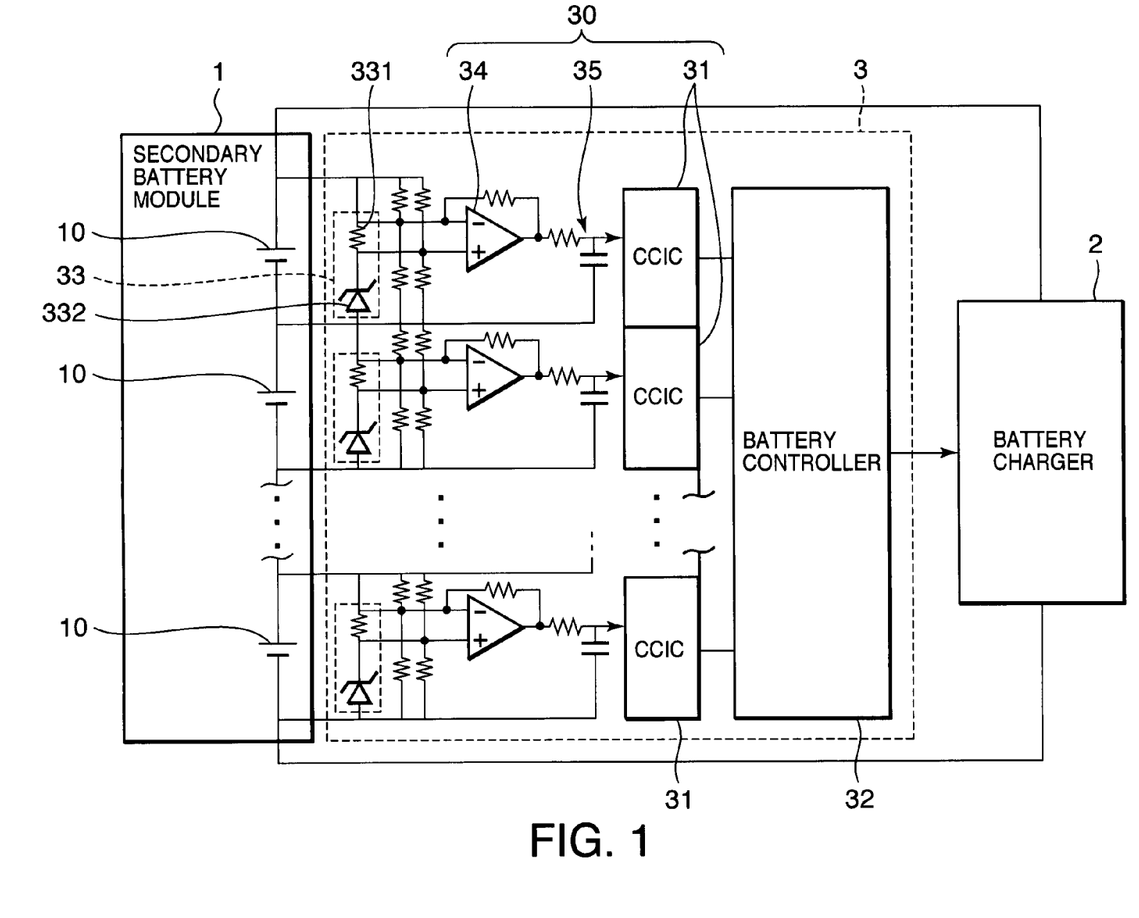
FIG. 1 is an electronic circuit diagram indicating a relationship of a charge control device according to this invention to a secondary battery module and a battery charger.

FIG. 1 shows a charge control device 3 that controls charge of a secondary battery module 1 by monitoring a charge quantity indicating the extent to which the secondary module, used as a motive power source in an electric vehicle, is charged and by controlling charging power output from a battery charger 2 that charges the secondary battery module 1 based upon the charge quantity.

The secondary battery module 1 includes n unit cells 10 connected in series. n represents any positive integer. The unit cells 10 are each constituted with a lithium-ion battery. However, the unit cells may be constituted with nickel hydride batteries or lead-acid batteries, instead of lithium-ion batteries.

The battery charger 2 includes an AC/DC converter. The AC/DC converter converts an alternating current to a direct current and supplies the direct current to the secondary battery module 1. The alternating current source may be, for instance, a residential electrical outlet.

The charge control device 3 includes a constant voltage circuit 33 connected in parallel to the unit cell 10 and a determination circuit 30, both disposed in correspondence to each unit cell 10. The constant voltage circuit 33 is constituted with a resistor 331 and a Zener diode 332 connected in series. The determination circuit 30 is constituted with an operational amplifier 34, an integrating circuit 35 and a cell control integrated circuit (hereafter referred to as a CCIC) 31.

The operational amplifier 34, connected to the two ends of the resistor 331, outputs a pulse signal corresponding to the potential difference between the potentials at the two ends of the resistor 331. In other words, as an electric current flows through the constant voltage circuit 33, the operational amplifier 34 outputs a pulse signal. The integrating circuit 35 is constituted with a resistor and a capacitor and outputs the results obtained by integrating the pulse signal to the CCIC 31.

As the charge progresses and the voltage between the terminals at the unit cell 10 becomes greater than the breakdown voltage at the Zener diode 332, an electric current flows through the constant voltage circuit 33, which includes the Zener diode 332, and a difference occurs between the potentials at the two sides of the resistor 331 connected in series to the Zener diode 332. In the following description, the breakdown voltage at the Zener diode 332 is to be referred to as a Zener voltage.

The Zener voltage at the Zener diode 332 may be set in advance to a level substantially equal to the full charge voltage of the unit cell 10 so as to enable detection of a unit cell 10 achieving its full charge voltage by detecting the flow of the current through the constant voltage circuit 33 as the potential difference between the two sides of the resistor 331. It is to be noted that the state of full charge voltage detected at the unit cell 10 as described above may be a momentary state attributable to a voltage pulsation at the AC/DC converter.

The determination circuit 30 executes the following processing in order to detect the state of full charge at the unit cell 10 by eliminating the influence of voltage pulsation.

The operational amplifier 34 outputs a pulse signal by detecting the difference between the potentials at the two sides of the resistor 331. The pulse signal output from the operational amplifier 34 is input to the CCIC 31 via the integrating circuit 35. Based upon the signal input from the corresponding integrating circuit 35, each CCIC 31 calculates a pulse signal time duty ratio and once the time duty ratio exceeds a predetermined ratio, the unit cell 10 is determined to have entered the state of full charge. In this example, the predetermined ratio is set to 50%.

The CCICs 31 each makes a determination as to whether or not the target unit cell 10 has reached the state of full charge, and each CCIC outputs a full charge signal if the determination is affirmative.

Based upon the full charge signals output from the CCICs 31, a battery controller 32 controls charging power output from the battery charger 2 to charge the secondary battery module 1.

The battery controller 32 is constituted with a microcomputer which includes a central processing unit (CPU), a read only memory (ROM), a random access memory (RAM) and an input/output interface (I/O interface). The battery controller 32 may be constituted with a plurality of microcomputers, as well.

The power output from an AC/DC converter will normally include a pulsating component. For this reason, terminal voltages at the secondary battery module 1 charged with the charging power output from the AC/DC converter in the battery charger 2 also pulsate. As the voltage at the secondary battery module 1 is detected over specific sampling cycles, the pulsation of the terminal voltages causes the voltage value to fluctuate with the timing of each detection and thus, accurate voltage detection cannot be assured with ease.

The voltage pulsation is a phenomenon inherent to the AC/DC converter and accordingly, the voltage pulsation can be suppressed by connecting a DC/DC converter, which executes DC-DC voltage conversion to the AC/DC converter. However, the addition of such a DC/DC converter with a complicated circuit structure is bound to increase the size of the battery charger 2. An increase in the size of the battery charger 2 is particularly undesirable in an application in which the secondary battery module 1 and the battery charger 2 must be installed in a limited installation space, e.g., in a vehicle.

In the charge control device 3 according to this invention, a Zener diode 332 is connected between the terminals of each unit cell 10 and a pulse signal is generated based upon the potential difference occurring between the two sides of a resistor 331 connected in series to the Zener diode 332, so as to detect the state of full charge at the particular unit cell 10 based upon the pulse signal time duty ratio detected in correspondence to the integrated pulse signal value. As a result, the charge quantity can be detected with a high level of accuracy, unaffected by charge voltage pulsation attributable to the AC/DC converter. In addition, by controlling the power output from the battery charger 2 based upon the detection results, the secondary battery module 1 can be reliably charged to achieve a full charge.

Figure 2A:
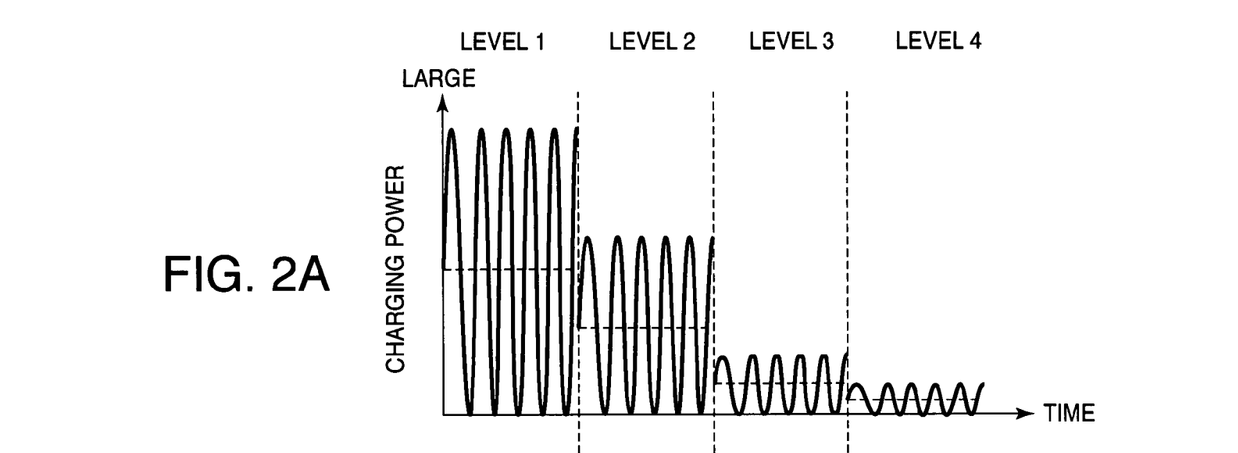
FIGS. 2A and 2B are timing charts indicating a relationship between a change in charging power supplied from a battery charger to the secondary battery module and a change occurring in a voltage at a unit cell in the secondary battery module.
Figure 2B:
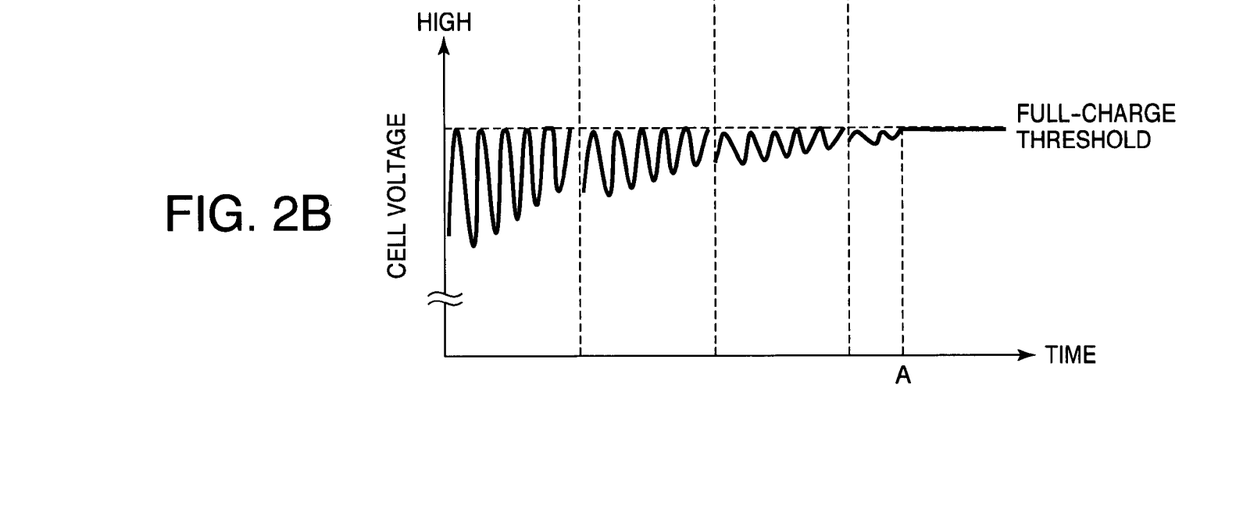

In reference to FIGS. 2A and 2B, the charge control under which a given unit cell 10 is charged is described.

It is assumed that a charge of the secondary battery module 1, currently charged to an extremely low level, is started by connecting the battery charger 2 to an AC source. As indicated in FIG. 2A, the power output from the AC/DC converter in the battery charger 2 to the secondary battery module 1 includes a pulsating component. As a result, the voltage at the secondary battery module 1 also pulsates as it increases, as indicated in FIG. 2B.

At each unit cell 10, as soon as the voltage between the terminals of the constant voltage circuit 33 becomes higher than the full charge voltage of the unit cell 10, an electric current flows through the constant voltage circuit 33, thereby creating a difference between the potentials at the two sides of the resistor 331. The period of time during which such a potential difference exists at the resistor 331 is equivalent to a period of time during which an electric current flows through the Zener diode 332. The resistance value at the resistor 331 is set in advance by taking into consideration the full charge voltage of the unit cell 10 and the Zener voltage at the Zener diode 332. The full charge voltage for the unit cell 10 is set to a sufficiently low voltage value by allowing a certain margin relative to a critical voltage at which the unit cell 10 will be overcharged.

Once the voltage at the unit cell 10 rises to a level exceeding the full charge voltage, the operational amplifier 34 outputs a pulse signal corresponding to the length of time over which the resistor 331 manifests a potential difference. Since the voltage at the unit cell pulsates as it rises, as indicated in FIG. 2B, the period of time over which an electric current flows through the Zener diode 332 gradually lengthens. In correspondence, the time duty ratio of the pulse signal output from the operational amplifier 34 also gradually increases.

The pulse signal is input to the CCIC 31 paired up with the particular operational amplifier 34 via the integrating circuit 35. The CCIC 31 detects the pulse signal time duty ratio from the signal output from the integrating circuit 35 and once the time duty ratio exceeds the predetermined ratio, i.e., 50%, it determines that the voltage at the corresponding unit cell 10 has reached a level equivalent to the full charge voltage and outputs a full charge signal to the battery controller 32. Upon receiving the full charge signal from any CCIC 31, the battery controller 32 outputs a charging power reducing signal, used to lower the charging power, to the battery charger 2.

Thus, if the pulse signal time duty ratio corresponding to any of the plurality of unit cells 10 constituting the secondary battery module 1 exceeds 50%, the battery controller 32 transmits a charging power reducing signal to the battery charger 2 so as to lower the charging power.

Upon receiving the charging power reducing signal, the battery charger 2 lowers the charging power in stages, as indicated in FIG. 2A. The stage at which the charging power is at its highest is to be referred to as level 1 in the description. The charging power is sequentially lowered to level 2, level 3 and then level 4. However, the number of stages through which the charging power is adjusted does not need to be four and it may be set to any number equal to or greater than two.

By lowering the charging power output from the battery charger 2 in stages as described above, the amplitude of the pulsating component in the charging power can be kept down. However, instead of lowering the charging power in stages, it may be reduced continuously. It is to be noted that as the charging power reducing signal is output, each CCIC 31 simultaneously resets the integral signal output from the corresponding integrating circuit 35 to zero through internal processing.

As the charging power is lowered to level 2, the charge voltage at the secondary battery module 1 is also temporarily lowered but the charge voltage then starts to rise again, as indicated in FIG. 2B. In this situation, the unit cell 10 is already charged with the charging power at level 1 and thus, the charge is resumed at level 2 with a potential higher than that corresponding to level 1.

At level 2, too, each time the voltage at a unit cell 10 reaches a level equivalent to the full charge voltage, an electric current flows through the corresponding constant voltage circuit 33, prompting the operational amplifier 34 to transmit a pulse signal. Once the duty ratio of the pulse signal input from the operational amplifier 34 via the integrating circuit 35 exceeds 50% the CCIC 31 transmits a full charge signal pertaining to the corresponding unit cell 10 to the battery controller 32. Upon receiving the full charge signal from any CCIC 31, the battery controller 32 outputs a charging power reducing signal, used to lower the charging power, to the battery charger 2. In response to the charging power reducing signal, the battery charger 2 lowers the charging power to level 3.

As the charging power is lowered to level 3, the charge voltage at the secondary battery module 1 is also temporarily lowered but the charge voltage then starts to rise again, as indicated in FIG. 2B. In this situation, the unit cell 10 is already charged with the charging power in the level 1-2 range and thus, the charge is resumed at level 3 with a potential higher than that corresponding to level 2.

At level 3, too, each time the voltage at a unit cell 10 reaches a level equivalent to the full charge voltage, an electric current flows through the corresponding constant voltage circuit 33, prompting the operational amplifier 34 to transmit a pulse signal. Once the duty ratio of the pulse signal input from the operational amplifier 34 via the integrating circuit 35 exceeds 50%, the CCIC 31 transmits a full charge signal pertaining to the corresponding unit cell 10 to the battery controller 32. Upon receiving the full charge signal from any CCIC 31, the battery controller 32 outputs a charging power reducing signal, used to lower the charging power, to the battery charger 2. In response to the charging power reducing signal, the battery charger 2 lowers the charging power to level 4.

As the charging power is lowered to level 4, the charge voltage at the secondary battery module 1 is also temporarily lowered but the charge voltage then starts to rise again, as indicated in FIG. 2B. In this situation, the unit cell 10 is already charged with the charging power in the level 1-3 range and thus, the charge is resumed at level 4 with a potential higher than that corresponding to level 3.

At level 4, too, each time the voltage at a unit cell 10 reaches a level equivalent to the full charge voltage, an electric current flows through the corresponding constant voltage circuit 33, prompting the operational amplifier 34 to transmit a pulse signal. Once the duty ratio of the pulse signal input from the operational amplifier 34 via the integrating circuit 35 exceeds 50%, the CCIC 31 transmits a full charge signal pertaining to the corresponding unit cell 10 to the battery controller 32.

At level 4, the battery controller 32 keeps charging the secondary battery module 1 with the power at level 4 even after a full charge signal is input thereto from a CCIC 31. Then, once full charge signals originating from all the CCICs 31 are input thereto, the battery controller 32 determines that the charge of the secondary battery module 1 has been completed and outputs a charge stop signal to the battery charger 2.

Figure 3A:
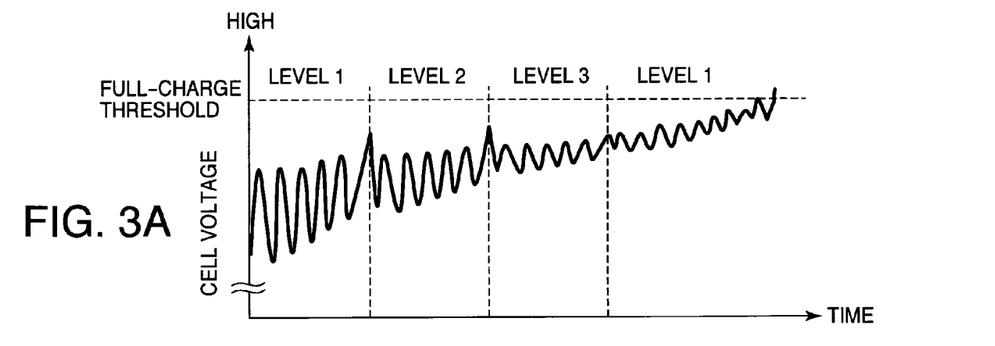
FIGS. 3A-3C are timing charts indicating a change in charging power used to charge the secondary battery module and changes occurring in voltages at different unit cells.
Figure 3B:
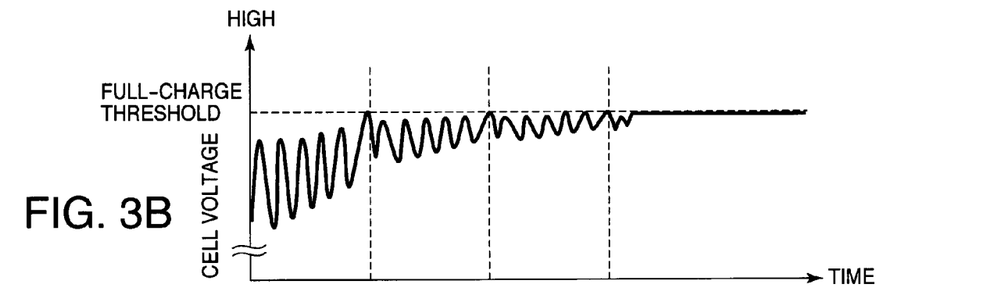
Figure 3C:
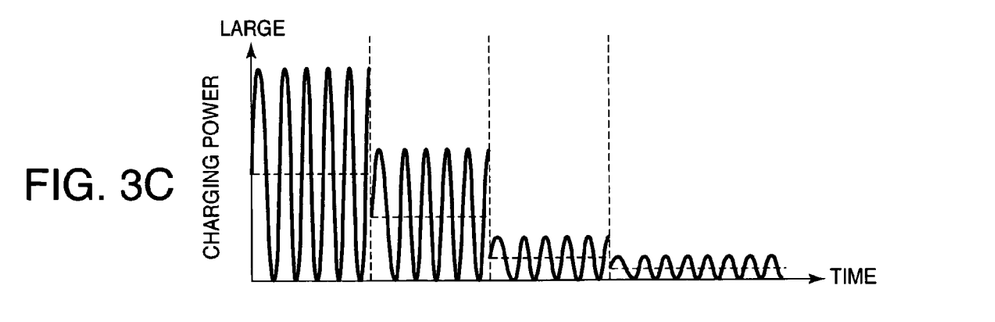

As FIGS. 3A-3C indicate, the voltages at the plurality of unit cells 10 constituting the secondary battery module 1 rise at varying rates while the secondary battery module 1 is charged, since the performance levels of the unit cells 10, for instance, may not be uniform.

As the charging power output from the battery charger 2 to charge the secondary battery module 1 is adjusted in four stages as indicated in FIG. 2A under the control described earlier, the voltage at a quick charging unit cell 10 achieves the full charge state at an early phase of level 4, as indicated in FIG. 3B but the voltage at a slow charging unit cell 10 does not achieve the full charge state well into the level 4, as indicated in FIG. 3A. The term "full charge state" in this context is equivalent to a pulse signal time duty ratio exceeding 50%.

Once a full charge signal is output in correspondence to any unit cell 10, the battery controller 32 in the charge control device 3 in the embodiment lowers the charging power provided from the battery charger 2. As a result, the secondary battery module 1 can be charged efficiently by minimizing any waste of charging power provided from the battery charger 2. In addition, until full charge signals are output in correspondence to all the unit cells 10, the battery controller 32 sustains the level of the charging power from the battery charger 2 at the lowest level, i.e., level 4. This means that a full charge state can be achieved reliably for a slow charging unit cell 10, as indicated in FIG. 3A, making it possible to reliably charge the secondary battery module 1 until it achieves the full charge state.

Figure 4A:
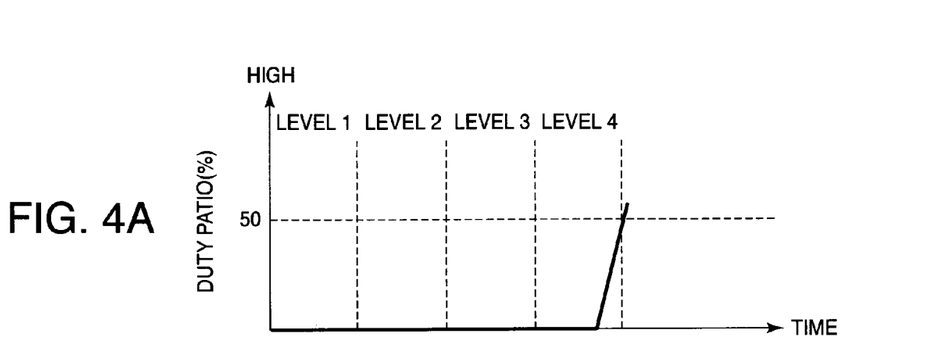
FIGS. 4A and 4B are timing charts indicating a waveform of a pulse signal output from an operational amplifier in the charge control device.
Figure 4B:
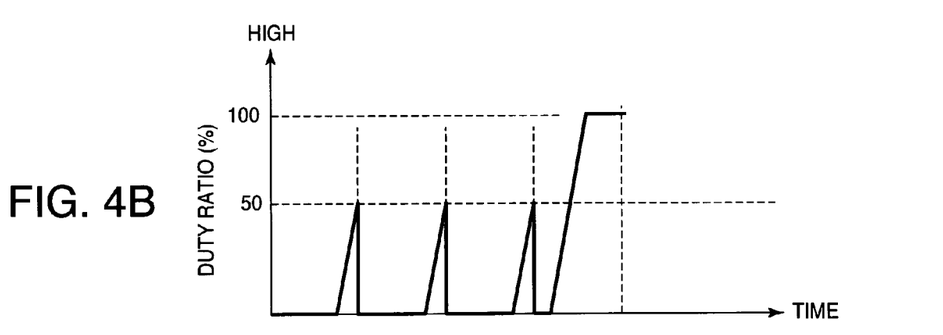

When the duty ratio at a slow charging unit cell 10 reaches 50%, which indicates the full charge state, as shown in FIG. 4A, the duty ratio at a quick charging unit cell 10 may have already reached 100%, as shown in FIG. 4B. However, since an electric current flows through the constant voltage circuit 33 and power is used up through heat generation at the resistor 331 in the quick charging unit cell 10, there is no risk of the quick charging unit cell 10 becoming overcharged.

Next, in reference to FIG. 5, the charge control routine executed by the battery controller 32 to achieve the charge control described above will be explained. The execution of this routine starts simultaneously as a charge of the secondary battery module 1 is started up. It is to be noted that a determination as to whether or not to start charging the secondary battery module 1 is made through a separate routine.

In a step S11, the battery controller 32 outputs a charge start signal, signaling the start of a level 1 charge of the secondary battery module 1, to the battery charger 2.

In a step S12, the battery controller 32 determines whether or not a full charge signal has been input from the CCIC 31 operating in conjunction with any unit cell 10. As explained earlier, the CCIC 31 outputs the full charge signal when the time duty ratio of the pulse signal indicating an electric current flow through the Zener diode 332 exceeds the predetermined ratio of 50%.

If the result of the determination in step S12 is negative, the battery controller 32 sustains the state of level 1 charge, in which the secondary battery module 1 is charged at level 1.

Once the result of the determination made in the step S12 turns affirmative, the battery controller 32 outputs a charging power reducing signal to the battery charger 2 in a step S13. Upon receiving the charging power reducing signal input thereto, the battery charger 2 lowers the charging power from level 1 to level 2.

Following the processing in the step S13, the battery controller 32 determines in a step S14 whether or not the charging power has been lowered to level 4. If it is determined that the charging power has not been lowered to level 4, the battery controller 32 repeats the processing of steps S12-S14. Thus, the charge is continuously executed with the charging power at level 2.

Consequently, in response to another full charge signal input thereto from the CCIC 31 operating in conjunction with any of the unit cells 10, the battery controller 32 outputs a charging power reducing signal to the battery charger 2 in the step S13. Upon receiving the charging power reducing signal input thereto, the battery charger 2 lowers the charging power from level 2 to level 3.

Subsequently, the battery controller 32 repeatedly executes the processing in steps S12-S14 while sustaining level 3, so as to continuously execute the charge with the charging power at level 3.

Then, in response to another full charge signal input thereto from the CCIC 31 operating in conjunction with any of the unit cells 10, the battery controller 32 outputs a charging power reducing signal to the battery charger 2 in step S13. Upon receiving the charging power reducing signal input thereto, the battery charger 2 lowers the charging power from level 3 to level 4.

Once the level of the charging power is lowered to level 4, the determination in the step S14 turns to be affirmative from negative. Once the results of the determination made in the step S14 turns to be affirmative, the battery controller 32 makes a determination in a step S15 whether or not full charge signals have been input in correspondence to all the unit cells 10.

A negative decision is made in the step S15 immediately after the result of the determination made in the step S14 turns to be affirmative. Until the determination turns to be affirmative in a step S15, the battery controller 32 continues to charge the secondary battery module 1 with the charging power at level 4.

After the secondary battery module 1 is continuously charged with the level 4 charging power and the full charge signals are finally input in correspondence to all the unit cells 10 as a result, the battery controller 32 outputs a charge stop signal to the battery charger 2 in a step S16 so as to end the charge of the secondary battery module 1. After executing the processing in step S16, the battery controller 32 ends the routine.

As described above, the charge control device 3 includes a constant voltage circuit 33 which is made up with a Zener diode 332 and a resistor 331 disposed in series and is connected in parallel to each unit cell 10. Thus, as the voltage between the terminals becomes higher than the breakdown coverage of the Zener diode 332, an electric current flows through the constant voltage circuit 33 which includes the Zener diode 332, thereby creating a potential difference between the potentials at the two sides of the resistor 331 connected in series to the Zener diode 332.

As the CCIC 31 makes a determination as to whether or not the unit cell 10 is in the full charge state based upon the pulse signal time duty ratio corresponding to the potential difference, the completion of the charge of the particular unit cell 10 can be detected accurately and with optimal timing. In addition, since any excess power that may be applied to the unit cell 10 is consumed as the resistor 331 generates heat in correspondence to the potential difference, the unit cell 10 does not become overcharged.

The battery controller 32 lowers the charging power used to charge the secondary battery module 1 in stages based upon full charge signals each indicating that a given unit cell 10 has been fully charged and thus, the unit cells 10 constituting the secondary battery module 1 can be charged with high efficiency. Furthermore, since the secondary battery module 1 is continuously charged with low power at level 4 until all the unit cells 10 become fully charged, all the unit cells 10 can be thoroughly charged.

As described above, the charge control device 3 is capable of ensuring that even if the charging power pulsates, the secondary battery module 1 can be reliably charged until the full charge state is achieved while preventing an overcharge of individual unit cells 10.

In addition, since the battery charger 2 used in conjunction with the charge control device 3 does not require a DC/DC converter for purposes of suppressing pulsation of the charging power, the charger device can be provided as a compact and inexpensive unit.

Figure 5:
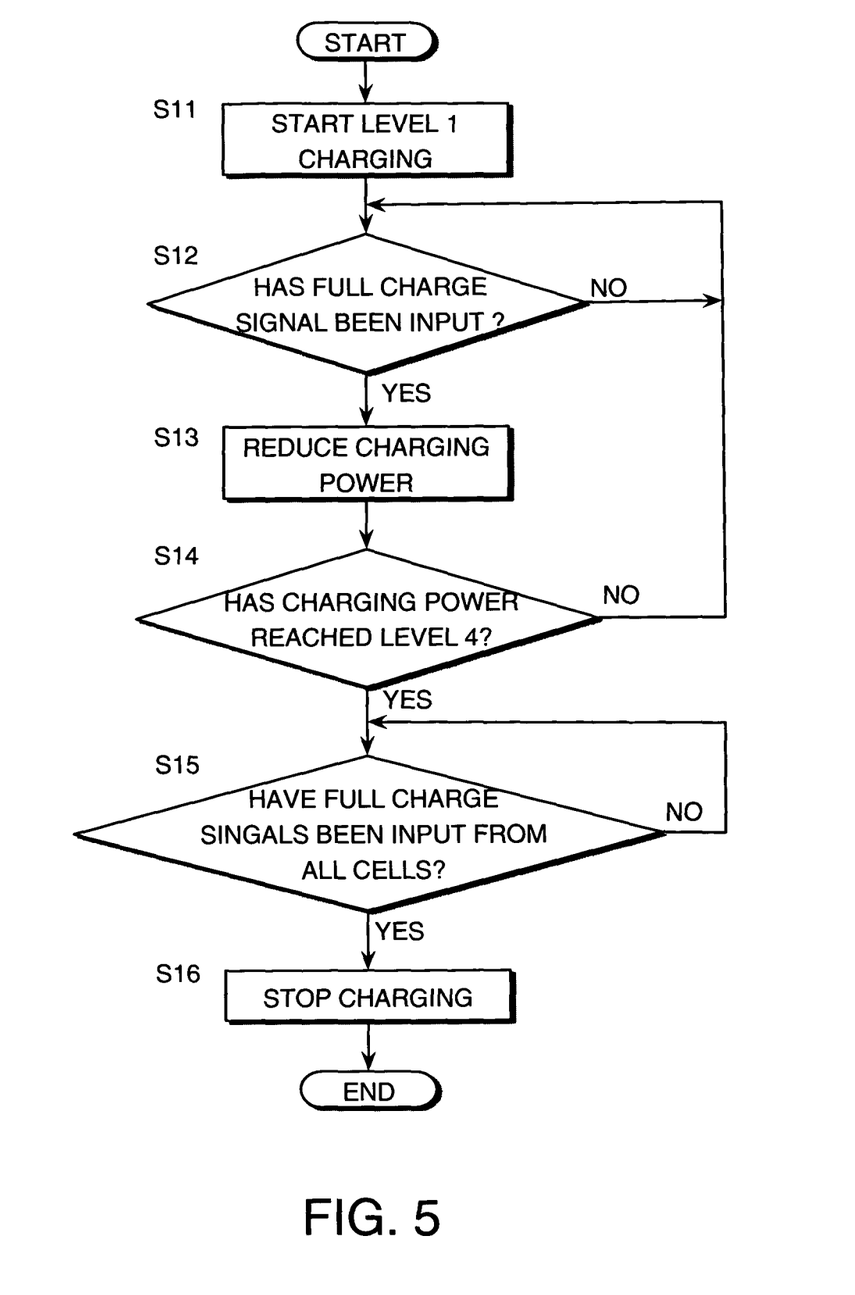
FIG. 5 is a flowchart of the secondary battery module charge control routine executed by a battery controller according to this invention.

While the charge of the secondary battery module 1 is terminated in the step S16 after all the unit cells 10 are determined to have been fully charged in step S15 in the charge control routine shown in FIG. 5, the charge of the secondary battery module 1 may be terminated after it is further charged over a predetermined length of time as an alternative. Through this alternative processing, it can be ensured with even greater reliability that the secondary battery module 1 is charged to the full charge level.

As a further alternative, the charge of the secondary battery module 1 may be terminated after a predetermined length of time elapses upon deciding in the step S15 that one of the unit cells 10 has been fully charged. In this case, if the voltages at some unit cells fail to rise due to a malfunction, the charge is terminated without charging the secondary battery module 1 over an extended period of time so as to protect the other normally functioning unit cells 10 from any adverse effect.

In the embodiment described above, the determination in the step S12 and the determination in the step S15 are both executed to determine whether or not the individual unit cells 10 have been fully charged by comparing the pulse signal time duty ratio with the same predetermined ratio of 50%.

However, it is also desirable to set the reference time duty ratio used in the determination in the step S12 as the trigger for lowering the charging power level to a value smaller than that selected for the reference time duty ratio in the step S15 as the charge stop trigger, particularly since such settings will minimize the level of power consumption required to charge the secondary battery module 1.

In addition, the reference value selected for the predetermined ratio to be compared with the time duty ratio may be adjusted in correspondence to the level of the charging power. For instance, the predetermined ratio may be set to 30% when charging the secondary battery module with the level 1 charging power, the predetermined ratio may be set to 40% when charging the secondary battery module with the level 2 charging power, and the predetermined ratio may be set to 50% when charging the secondary battery module with the level 3 charging power.

Since the amplitude of the pulsating component included in charging power at a higher level is greater, the peak value of the voltage between the terminals at each unit cell tends to momentarily reach the full charge voltage, and thus, an electric current tends to flow through the constant voltage circuit 33 readily at a higher charging power level. In other words, at a higher charging power level, the resistor 331 tends to generate heat more readily, resulting in greater energy loss. The extent of such energy loss can be reduced by selecting a greater value for the predetermined ratio at a lower charging power level.

The contents of Tokugan 2009-140978, with a filing date of Jun. 12, 2009 in Japan, and Tokugan 2010-124987, with a filing date of May 31, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, while the constant voltage circuit 33 is disposed in correspondence to each unit cell 10 in the embodiment described above, the control device may include a constant voltage circuit 33 disposed in correspondence to each cell group made up with a plurality of the unit cells 10 and may make a decision as to whether or not the particular cell group has achieved a state of full charge without departing from the technical scope of this invention.

The battery controller 32 in the embodiment described above, lowers the charging power output from the battery charger 2 through the level 1-level 4 range in stages each time one of the unit cells 10 achieves the full charge state. However, charging by the battery charger 2 may be stopped once any unit cell 10 achieves the full charge state without departing from the technical scope of this invention.

The embodiments of this invention in which an exclusive property or privilege is claimed are defined as follows:

1. A charge control device for controlling a charge power by a battery charger that charges a secondary battery module with a direct current provided from an AC/DC converter, the secondary battery module comprising a plurality of unit cells or a plurality of cell groups each comprising a plurality of unit cells, the device comprising:
   a constant voltage circuit that connects both ends of each unit cell or each cell group, the constant voltage circuit comprising a Zener diode and a resistor connected in series;
   a determination circuit that makes a determination based upon a potential difference between potentials on two sides of the resistor as to whether or not the unit cell or the cell group is in a full charge state, the determination circuit comprising an operational amplifier that generates a pulse signal in correspondence to the potential difference between the potentials at the two sides of the resistor, an integrating circuit that integrates the pulse signal and outputs an integral signal, and a cell control integrated circuit that calculates a pulse signal duty ratio based upon the integral signal and determines that the unit cell or the cell group is in the full charge state when the duty ratio exceeds a predetermined ratio; and
   a programmable controller programmed to control the charge power based upon the full charge state.

2. The charge control device as defined in claim 1, wherein the predetermined ratio is set equal to a time duty ratio of 50 percent.

3. A charge control device for controlling a charge power by a battery charger that charges a secondary battery module with a direct current provided from an AC/DC converter, the secondary battery module comprising a plurality of unit cells or a plurality of cell groups each comprising a plurality of unit cells, the device comprising:
   a constant voltage circuit that connects both ends of each unit cell or each cell group, the constant voltage circuit comprising a Zener diode and a resistor connected in series;
   a determination circuit that makes a determination based upon a potential difference between potentials on two sides of the resistor as to whether or not the unit cell or the cell group is in a full charge state; and
   a programmable controller programmed to control the charge power,
   wherein the constant voltage circuit and the determination circuit are disposed in correspondence to each unit cell or each cell group, and the programmable controller is further programmed to reduce the charging power that the battery charger outputs to charge the secondary battery module once any unit cell or cell group enters the full charge state.

4. The charge control device as defined in claim 3, wherein the constant voltage circuit and the determination circuit are disposed in correspondence to each unit cell or each cell group, and the programmable controller is further programmed to reduce the charging power that the battery charger outputs to charge the secondary battery module each time any unit cell or cell group enters the full charge state.

5. The charge control device as defined in claim 3, wherein the constant voltage circuit and the determination circuit are disposed in correspondence to each unit cell or each cell group, and the programmable controller is further programmed to cause the battery charger to keep charging the secondary battery module until all the unit cells or cell groups achieve the full charge state.

6. The charge control device as defined in claim 5, wherein the programmable controller is further programmed to cause the battery charger to keep charging the secondary battery module until a predetermined length of time elapses after all the unit cells or cell groups enter the full charge state.

7. The charge control device as defined in claim 3, wherein the programmable controller is further programmed to cause the battery charger to stop charging the secondary battery module, once a predetermined length of time elapses after any unit cell or cell group enters the full charge state.

8. A charge control device for controlling a charge power by a battery charger that charges a secondary battery module with a direct current provided from an AC/DC converter, the secondary battery module comprising a plurality of unit cells or a plurality of cell groups each comprising a plurality of unit cells, the device comprising:
   a constant voltage circuit that connects both ends of each unit cell or each cell group, the constant voltage circuit comprising a Zener diode and a resistor connected in series;
   means for making a determination based upon a potential difference between potentials on two sides of the resistor as to whether or not the unit cell or the cell group is in a full charge state, the means for making the determination comprising an operational amplifier that generates a pulse signal in correspondence to the potential difference between the potentials at the two sides of the resistor, an integrating circuit that integrates the pulse signal and outputs an integral signal, and a cell control integrated circuit that calculates a pulse signal duty ratio based upon the integral signal and determines that the unit cell or the cell group is in the full charge state when the duty ratio exceeds a predetermined ratio; and
   means for controlling the charge power based upon the full charge state.

9. A charge control method for controlling a charge power by a battery charger that charges a secondary battery module with a direct current provided from an AC/DC converter, the secondary battery module comprising a plurality of unit cells or a plurality of cell groups each comprising a plurality of unit cells, the method comprising:
   connecting both ends of each unit cell or each cell group by a constant voltage circuit, the constant voltage circuit comprising a Zener diode and a resistor connected in series, making a determination based upon a potential difference between potentials on two sides of the resistor as to whether or not the unit cell or the cell group is in a full charge state, wherein making the determination comprises generating a pulse signal in correspondence to the potential difference between the potentials at the two sides of the resistor, integrating the pulse signal, outputting an integral signal, calculating a pulse signal duty ratio based upon the integral signal, and determining that the unit cell or the cell group is in the full charge state when the duty ratio exceeds a predetermined ratio; and controlling the charge power based upon the full charge state.

\* \* \* \* \*